L. M. FLECKNER.
TREE SHAKER.
APPLICATION FILED DEC. 16, 1918.

1,337,398.

Patented Apr. 20, 1920.

INVENTOR
L. M. Fleckner
BY
Carlos P. Griffin
ATTORNEYS

UNITED STATES PATENT OFFICE.

LUTHER MILTON FLECKNER, OF SAN FRANCISCO, CALIFORNIA.

TREE-SHAKER.

1,337,398.  Specification of Letters Patent.  Patented Apr. 20, 1920.

Application filed December 16, 1918. Serial No. 267,087.

*To all whom it may concern:*

Be it known that I, LUTHER M. FLECKNER, a citizen of the United States, residing at San Francisco, in the county of San Francisco, State of California, have invented a new and useful Tree-Shaker, of which the following is a specification in such full and clear terms as will enable those skilled in the art to construct and use the same.

This invention relates to a tree shaker and its object is to produce an apparatus which may be used for the purpose of shaking the limbs of trees to shake off the fruit or nuts from the limbs, means being provided on the shaker to firmly clasp the desired limb.

Other objects of the invention will appear as the description proceeds.

An embodiment of the invention is shown in the drawings in which the same reference numeral is applied to the same portion throughout, but I am aware that there may be modifications thereof.

Figure 1:
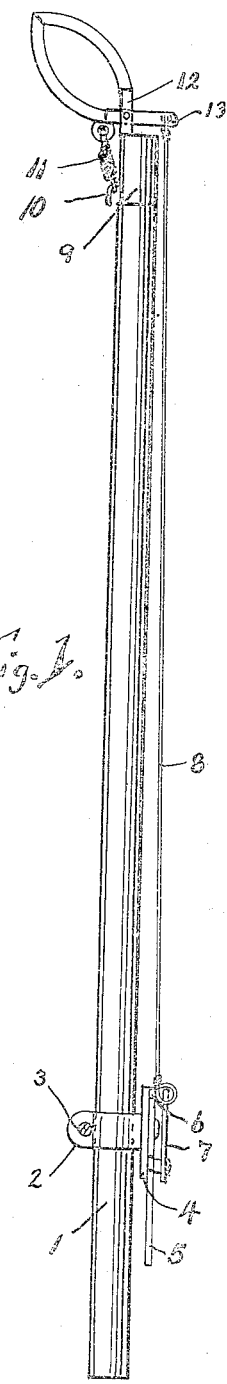
Figure 1 is a side elevation of the complete shaker.
Figure 2:
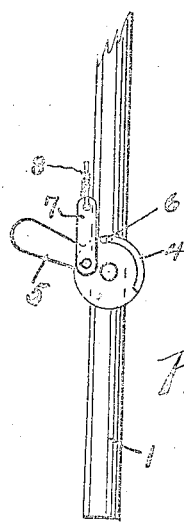
Fig. 2 is a view of the operating lever looking at right angles to Fig. 1.

The shaker comprises a pole 1 of such length as may be necessary for the given trees. The pole has a clamp 2 secured thereto by means of a screw 3 and which clamp carries a disk 4. The disk 4 has a stop 6 and it has a lever 5 pivoted thereon with stops which are adapted to come against the stop 6.

This lever 5 has a link 7, which link is connected to a wire rod 8 extending to the top of the pole and connected with the arm 13. At the top of the pole there is a ferrule 9 which is provided with a hook 10. The hook has a spring 11 connected with the arm 13, said spring being adapted to open the arm when the lever 5 is raised. The ferrule also carries an arm 12 to which the arm 13 is pivotally mounted. When said arms are brought together as shown in Fig. 1, they provide means for holding a branch firmly while the tree is being shaken.

It will be noticed that the disk is so connected to the link that when the arms are closed the handle 5 is straight down, note Fig. 1, thereby locking the arm in the closed position so that the shaker will hang on a limb practically without being held.

Having thus described my invention, what I claim as new and desire to secure by Letters Patent of the United States is as follows, express reservation being made of permissible modifications.

A tree shaker comprising a rod, one fixed arm and a pivoted arm at the one end thereof, a spring to hold one of the arms normally away from the other arm, a rod connected with the pivoted arm and extending toward the opposite end of the first named rod, a link to which the second rod is connected, a revoluble disk carrying an eccentric connection with said link, a handle for rotating the disk, and a stop pin to prevent the disk from being rotated in either direction more than a fixed amount, the disk pin being under the disk pivot point when the arms are brought together.

In testimony whereof I have hereunto set my hand this 18" day of November, A. D. 1918.

LUTHER MILTON FLECKNER.